J. J. RHINELANDER.
PIPE GRIPPING DEVICE.
APPLICATION FILED NOV. 13, 1918.
1,309,546.
Patented July 8, 1919.
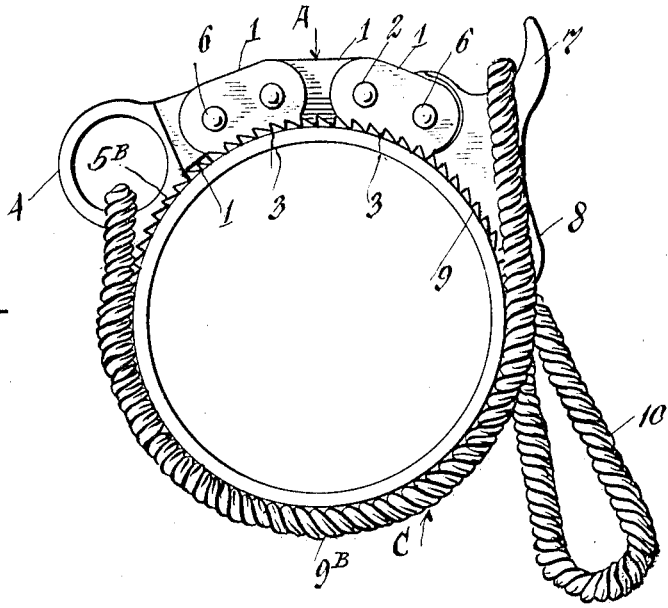
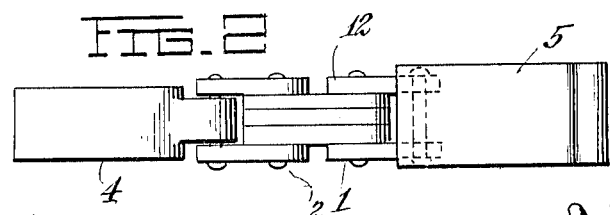
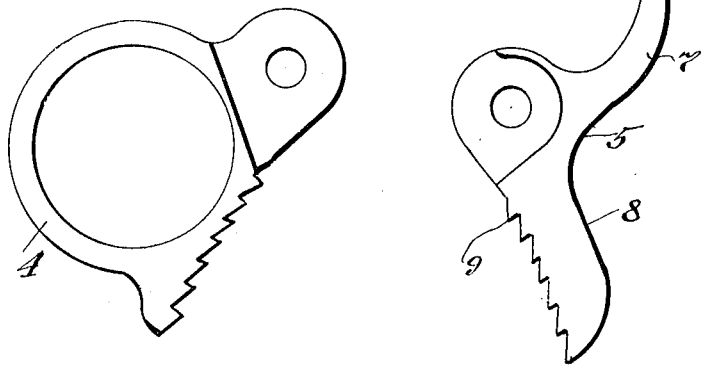
Inventor
James J. Rhinelander
By Victor J. Evans
Attorney
Witnesses

UNITED STATES PATENT OFFICE.

JAMES J. RHINELANDER, OF PITTSBURGH, PENNSYLVANIA.

PIPE-GRIPPING DEVICE.

1,309,546.  Specification of Letters Patent.  Patented July 8, 1919.

Application filed November 13, 1918. Serial No. 262,318.

*To all whom it may concern:*

Be it known that I, JAMES J. RHINELANDER, a citizen of the United States, residing at Pittsburgh, in the county of Allegheny and State of Pennsylvania, have invented new and useful Improvements in Pipe-Gripping Devices, of which the following is a specification.

This invention relates to a pipe grip and more particularly to an improvement over my copending application, Serial No. 40,839, filed July 20th, 1915, and has for its primary object to provide a device of this character in which the parts are so constructed and associated that the maximum amount of surface thereof will engage without interruption, an entire peripheral portion of a pipe.

An object of the invention is to increase the effective grip between a device of this character and a pipe for preventing mutilation and to positively prevent slipping of the grip upon the pipe irrespective of the pressure applied to the device.

Besides the above my invention is distinguished in the use of two flexible devices adjustably associated, each of a character and shape to coöperate in a manner to engage without interruption, one entire portion of a pipe thereby subjecting the entire pipe, at the point of grip to an even pressure, thereby preventing distortion of the same which is very important when the device is used on oil well pipes where owing to the association of the pipes each pipe is subject to excessive strains when connecting and disconnecting or when removing from the well.

With these and other objects in view the invention will be better understood from the following detailed description taken in connection with the accompanying drawing wherein:

Figure 1 is an elevation of my device shown in applied position.

Fig. 2 is a top plan view of a portion thereof.

Fig. 3 is a detailed view of one end member.

Fig. 4 is a detailed view of the other end member.

Again referring to the drawing which illustrates my invention in one of its forms, the letter "A" designates one flexible device while the letter "C" designates the other flexible device which are adjustably associated with each other. The flexible device "A" consists of a plurality of tooth links 1 pivotally connected together as indicated at 2. Each of the links are provided with teeth 3 arranged in an arc of a circle so as to coöperate with the peripheral surface of a pipe. The device "A" includes end members 4 and 5, the former in the shape of a ring having a tooth projection 5$^B$ for engagement with the pipe and further having a pivotal connection with certain links as indicated at 6. The member 5 is of a bell crank formation with one limb formed into a hook 7, while the other limb 8 is toothed as indicated at 9 for engagement with the pipe.

In this particular instance I have shown the flexible device 6 as consisting of a length of rope 9$^B$ having one end fixed to the ring 4 while the other end portion of the rope is adjustably associated with the hook 7 and terminates in a loop 10 for engagement with any suitable instrument. It will be noted by referring to Fig. 1 that the rope 9$^B$ passes around the hook 7 at a point to throw the member 5 about its pivot in a direction to force the teeth 9 into engagement with the pipe. In concluding my description I wish to call attention to the fact that the construction of the members of the device "A" and the flexible element or device "C," is such that the entire peripheral surface of the pipe at one point is effectively gripped thus distributing the pressure of the device upon the pipe over a maximum surface, and therefore preventing mutilation of the pipe. Another important feature of my invention is that the maximum amount of surface is brought into contact between my device and the pipe thereby increasing the frictional engagement.

From the foregoing description taken in connection with the accompanying drawing it should be apparent that I provide a device of simple substantial construction that may be quickly applied to a pipe in a manner to effectively engage the same, and further in a manner to distribute the strain in a systematic manner around the pipe. Of course it is to be understood that the exact character and construction of the flexible devices "A" and "C" may be changed at will and therefore I do not desire to be limited in any manner except as set forth in the claims hereunto appended.

Having described my invention, what I claim is:

1. A pipe grip comprising a plurality of toothed links pivoted together, a toothed ring pivoted to certain of said links, a substantially bell crank hook member connected to other of said links and a length of rope having one end fixed to said ring and its other end adapted to be adjustably associated with the hook member at a point to force the hook member in a direction toward the pipe.

2. A pipe grip comprising a plurality of toothed links pivoted together, a toothed ring pivoted to certain of said links, a substantially bell crank hook member connected to other of said links and a length of rope having one end fixed to said ring and its other end adapted to be adjustably associated with the hook member at a point to force the hook member in a direction toward the pipe, the teeth of said links, ring, and hook member being arranged to coöperate with the rope in a manner to engage without interruption one entire peripheral portion of a pipe.

In testimony whereof I affix my signature.

JAMES J. RHINELANDER.

Copies of this patent may be obtained for five cents each, by addressing the "Commissioner of Patents, Washington, D. C."